US012600206B2

(12) United States Patent
Medley

(10) Patent No.: US 12,600,206 B2
(45) Date of Patent: Apr. 14, 2026

(54) GLARE BLOCKING ASSEMBLY

(71) Applicant: Jennifer M. Medley, Oklahoma City, OK (US)

(72) Inventor: Jennifer M. Medley, Oklahoma City, OK (US)

( * ) Notice: Subject to any disclaimer, the term of this patent is extended or adjusted under 35 U.S.C. 154(b) by 108 days.

(21) Appl. No.: 17/498,410

(22) Filed: Oct. 11, 2021

(65) Prior Publication Data

US 2022/0111707 A1 Apr. 14, 2022

Related U.S. Application Data

(60) Provisional application No. 63/089,901, filed on Oct. 9, 2020.

(51) Int. Cl.
*B60J 3/02* (2006.01)
*B60J 3/04* (2006.01)
*G02B 1/11* (2015.01)

(52) U.S. Cl.
CPC . *B60J 3/04* (2013.01); *B60J 3/02* (2013.01); *G02B 1/11* (2013.01)

(58) Field of Classification Search
CPC ..... B60J 3/04; B60J 3/02; B60J 3/0286; B60J 3/0221; B60J 3/0247; B60J 3/007; B60J 1/002; G02B 1/11; G02B 1/00; G02B 1/04; G02B 5/223
USPC ............ 296/97.1, 97.2, 97.7, 96.19; 359/601
See application file for complete search history.

(56) References Cited

U.S. PATENT DOCUMENTS

| | | | | | |
|---|---|---|---|---|---|
| 3,511,365 | A | * | 5/1970 | Dow ...................... | B60J 3/0286 206/390 |
| 3,649,069 | A | * | 3/1972 | Zip ........................... | B60J 3/02 160/DIG. 12 |
| 4,749,222 | A | * | 6/1988 | Idland ................... | B60J 3/0286 296/97.3 |
| 4,842,322 | A | * | 6/1989 | Iu .............................. | B60J 3/02 296/97.7 |
| 4,862,944 | A | * | 9/1989 | Hendershot ............ | B60J 3/0286 160/354 |

(Continued)

FOREIGN PATENT DOCUMENTS

| | | | | |
|---|---|---|---|---|
| CN | 201309395 Y | * | 9/2009 | |
| CN | 201366929 Y | * | 12/2009 | |

(Continued)

OTHER PUBLICATIONS

Nagflex—Inoac—Wayback Machine, Aug. 4, 2020 (Year: 2020).*

(Continued)

*Primary Examiner* — Amy R Weisberg
*Assistant Examiner* — Wenwei Zhuo
(74) *Attorney, Agent, or Firm* — DUNLAP CODDING, P.C.

(57) ABSTRACT

A system and method for visual, glare, and sun protection for use with windows, doors, and the like. The system is comprised of a self-adhering, transparent material used in combination with a window. The transparent material is positioned on the interior surface of the window by an individual based on the position of a light source. The transparent material absorbs the glare of the light source when in use. When visual protection from the light source is no longer needed, the transparent material may be easily removed for future use.

10 Claims, 5 Drawing Sheets

(56)                References Cited

U.S. PATENT DOCUMENTS

| 5,247,391 | A | * | 9/1993 | Gormley | B60J 3/02 |
| | | | | | 296/97.7 |
| 5,829,507 | A | * | 11/1998 | Pawlowski | B60J 3/0286 |
| | | | | | 160/370.21 |
| 8,196,790 | B2 | * | 6/2012 | Iida | B29C 45/1615 |
| | | | | | 248/205.5 |
| 9,573,531 | B2 | * | 2/2017 | Zhang | F16M 11/16 |
| 9,873,311 | B1 | * | 1/2018 | Bonati | B60J 3/0286 |
| 11,524,556 | B2 | * | 12/2022 | Brentzel | B60J 3/0286 |
| 2005/0063065 | A1 | * | 3/2005 | Cicale | B60J 3/0286 |
| | | | | | 359/601 |
| 2005/0167522 | A1 | * | 8/2005 | Wheatley | A61L 9/042 |
| | | | | | 239/34 |
| 2006/0228324 | A1 | * | 10/2006 | Uang | A61L 9/048 |
| | | | | | 424/76.2 |
| 2019/0047385 | A1 | * | 2/2019 | Archer | G02F 1/01 |
| 2019/0338085 | A1 | * | 11/2019 | Broggi | C09D 7/68 |
| 2020/0156449 | A1 | * | 5/2020 | Raad | B32B 27/32 |
| 2021/0394593 | A1 | * | 12/2021 | Benson | B60J 3/0286 |

FOREIGN PATENT DOCUMENTS

| CN | 201428728 | Y | * | 3/2010 | |
| CN | 201792541 | U | * | 4/2011 | |
| CN | 201908551 | U | * | 7/2011 | |
| CN | 102381160 | A | * | 3/2012 | |
| CN | 105172538 | A | * | 12/2015 | |
| JP | H1016146 | A | * | 1/1998 | |
| KR | 101792689 | B1 | * | 11/2017 | |
| NL | 1033066 | C2 | * | 6/2008 | B60J 3/0286 |

OTHER PUBLICATIONS

Nagflex® _ INOAC for polyurethane, rubber, plastics and composites (Year: 2023).*
CN 201366929 Y, machine translation (Year: 2009).*
Shu (CN 201309395 Y), machine translation (Year: 2009).*
Chang et al. (CN 201366929 Y), machine translation from EPO, accessed Apr. 17, 2025 (Year: 2025).*
Chang et al. (CN 201366929 Y); STIC Translations Service Center provided translation (Year: 2025).*

* cited by examiner

GLARE BLOCKING ASSEMBLY

CROSS-REFERENCE TO RELATED APPLICATIONS

This application claims priority to U.S. Provisional Application Ser. No. 63/089,901 filed on Oct. 9, 2020, the entire contents being hereby expressly incorporated herein by reference.

BACKGROUND

The glare from the sun is one of the most dangerous distractions of driving. When the sun is low in the horizon, the angle of direct sunlight creates a strong glare across the windshield. The glare may cause temporary blindness, distort traffic control devices, and may even make it difficult for a driver to see surrounding traffic. The situation is worst during the height of morning and evening commutes for east- and west-bound traffic, respectively. When the sun directly rests on the horizon, a sudden, direct flash of sunlight lasting a mere deci-second can easily blind the driver. Nonetheless, the need for reduction and/or blocking of the glare from the sun, is an endeavor that is absolutely necessary to meet needs of each driver.

Car manufacturers have attempted to block the glare from the sun by the installation of sun visors on many vehicles; however, a need for sun visor extensions was addressed by many in the industry (U.S. Pat. No. 5,271,653, December 1993, Shirley; U.S. Pat. No. 6,286,887 B1, September 2001, Hashmi; U.S. Patent Application 2002/0130530, September 2002, Zenisek; U.S. Pat. No. 7,163,252 B1, January 2007, Neault; U.S. Pat. No. 4,923,238, May 1990, Morgulis, Tilman, Shemes). However, the sun visors and sun visor extensions only provide protection if the glare is in the top region of the windshield and may obstruct the driver's view. When the area of intense glare lies below the sun visor and/or the sun visor extender, the driver may have to raise one hand to shield the glare while keeping only one hand on the steering wheel.

Another group of disclosures have electro-chromatic elements whose transparency can be varied according to the amount of electric voltage or current applied. U.S. Patent Application 2007/0133078 A1 discloses a transparent glazing, and a control method thereof, with a field of view that can be darkened over a portion of its surface by electrically controlling at least one functional element incorporated into a multilayer composite, the light transmission of which glazing can be varied reversibly. The functional element, for example a solid-state electrochromic multilayer system, includes at least one electrochromic functional layer enclosed between two surface electrodes. The surface electrodes and the leads of the surface electrodes are matched to one another and spaced spatially with respect to one another such that darkening starts at one edge of the functional element and, with a remaining voltage applied between the surface electrodes, propagates continuously over the surface of the functional element until it is completely and uniformly colored. The glazing can be used as an electrically controllable shield for windshields of vehicles or the like.

U.S. Pat. No. 6,811,201 discloses an automatic sun visor system for a vehicle, which includes a light detecting apparatus for detecting sunlight incident upon the face of an occupant of the vehicle. A microcontroller receives a control signal from the light detecting apparatus, and an adjustable sun visor receives a darkening control signal from the microcontroller. The darkening control signal activates the adjustable sun visor in response to the degree of sunlight detected. The system can darken a specific required area in the visor. However, this disclosure has the limitation of a visor; a visor fulfills its purpose only if the sun glare is viewed in the top region of the windshield. It also requires a sophisticated digital camera and sensor system.

DE102005007427A1 discloses a motor vehicle having a window pane with a segment such as sun visor having a self-sounding layer in dependence of light impinging on the segment. A glare sensor measures the eyelid position and/or a pupil size and/or position of the eye of a passenger of the vehicle. A controller provides automatic adjustment of the transparency of the segment of the window pane in dependence of the output signal of the glare sensor. Similar to the visor, the visor segment only serves its purpose when the sun glare area is in the top region of the windshield, and the disclosure requires a sophisticated glare sensor system.

U.S. Pat. No. 4,892,394 discloses an electronic shield as an electronically operated grid that enables the operators of motor vehicles and other vehicles (such as airplanes) to control the shading of a windshield. It employs electrochromic technology to electronically darken section or sections of the windshield in order to minimize the effects of glare from the sun, reflective objects, or the lights of other vehicles, as driving conditions dictate. In addition, all sections of the windshield can be darkened at once when the vehicle is parked, or at other times, to shield the interior from the sun.

One other disclosure provides filtering, such as the use of a liquid crystal display (LCD) screen with camera and sensors to detect the existence and position of a light source. These components, along with the visual detection of the driver, can be used to determine which portions of the LCD screen should be activated to block the light source from the driver's eyes.

SUMMARY

The following discloses a method for reducing the effect of a glare from a light source, such as but not limited to the sun, as the glare is perceived by an individual located within vehicle, for example, an automobile. A shield is positioned on the interior surface of the window between the individual and the glare so as to block the glare from the individual. The shield has a first surface, a second surface, and at least one edge. At least one of the surfaces has a tackiness, which allows the shield to temporarily adhere to the inner surface of the window. Once the individual no longer perceives the glare from the light source, the shield may be removed from the inner surface of the windshield for future use.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figures 1, 2:
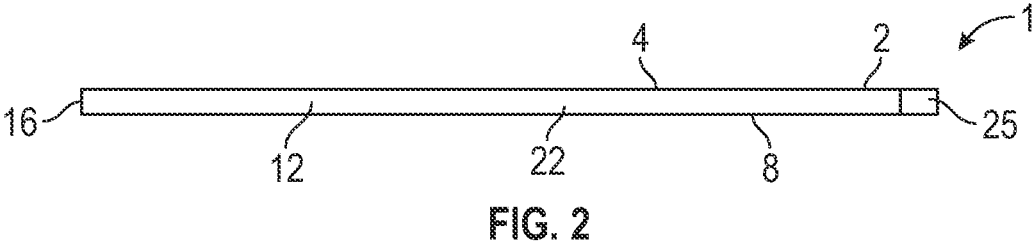
FIG. 1 is a front view of an exemplary embodiment of a shield in accordance with the present disclosure.
FIG. 2 is a side view of the exemplary embodiment of the shield depicted in FIG. 1.

The following detailed description refers to the accompanying drawings. The same reference numbers in different drawings may identify the same or similar elements.

The mechanisms proposed in this disclosure circumvent the problems described above. The present disclosure describes a method which attenuates a glare from the sun perceived by an individual located in a vehicle such as an automobile.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, the term "removable" means able to be taken off or moved away from a position occupied without destruction. Thus, if a first component is removably connected to a second component, the first component can be taken off or moved away from the second component without destruction of either the first component or the second component.

As used herein, all numerical values or ranges (e.g., units of length such as micrometers or millimeters) include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc. 2.1, 2.2, 2.3, 2.4, 2.5, etc., and so forth. References to a series of ranges include ranges which combine the values of the boundaries of different rages within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

In accordance with the present disclosure, the method which attenuates a glare from a light source, such as but not limited to a sun, lamp post, or the like, allows for an individual located in an automobile to safely travel in the presence of the perceived glare. As discussed above, the majority of the aforementioned prior art references include sun visors or sun visor extensions for blocking the glare from the sun. However, the area of intense glare may continue to lie below the sun visor/sun visor extender, requiring the driver to remove one hand from the wheel to personally block the glare. Other prior art references disclose electronic versions for blocking the glare from the sun. However, the electronic versions disclose blocking the glare from the sun near the top of the windshield and/or require driver input to effectively block the glare from the sun. The continued presence of the glare from the sun, or another light source, which lies below the top of the windshield, along with the driver input required to operate the prior art disclosures does not alleviate the issue of distracted/dangerous driving conditions. The present disclosure addresses these deficiencies with a vehicle, and a methodology for positioning a shield on an inner surface of a window between an individual and a glare from the light source, such as the sun, so as to block the glare from the individual.

The shield is constructed of a substrate having a first surface, a second surface, and at least one outer peripheral edge, the first surface having a tackiness to permit the shield to temporarily adhere to the inner surface of the window, the shield being constructed of a polymeric material gel having a thickness within a range from about 1.5 millimeters to about 25.4 millimeters, wherein the polymeric material gel is transparent and may also include a pigment to attenuate light as such light passes from the first surface to the second surface of the shield. In a preferred embodiment, the polymeric material gel may have a thickness within a range from about 6.35 millimeters to about 12.7 millimeters. The allowed visual light transmission through the shield (e.g., from the first surface to the second surface) is within a range from 25% to 80%.

Referring now to the drawings, FIG. 1 illustrates a front view of an exemplary embodiment of a shield 1 constructed in accordance with the present disclosure. FIG. 2 illustrates a side view of the shield 1 depicted in FIG. 1. A glare blocking assembly 45 (See FIG. 4) will includes the shield 1 in combination with a window 40 of a vehicle 52. In another embodiment, the shield 1 may be positioned on an inner surface of any transparent material, such as a window, to attenuate a glare from the light source. In another embodiment, more than one shield 1 may be positioned on an inner surface of a transparent material, to attenuate the glare from the light source.

Figures 3A, 3B:
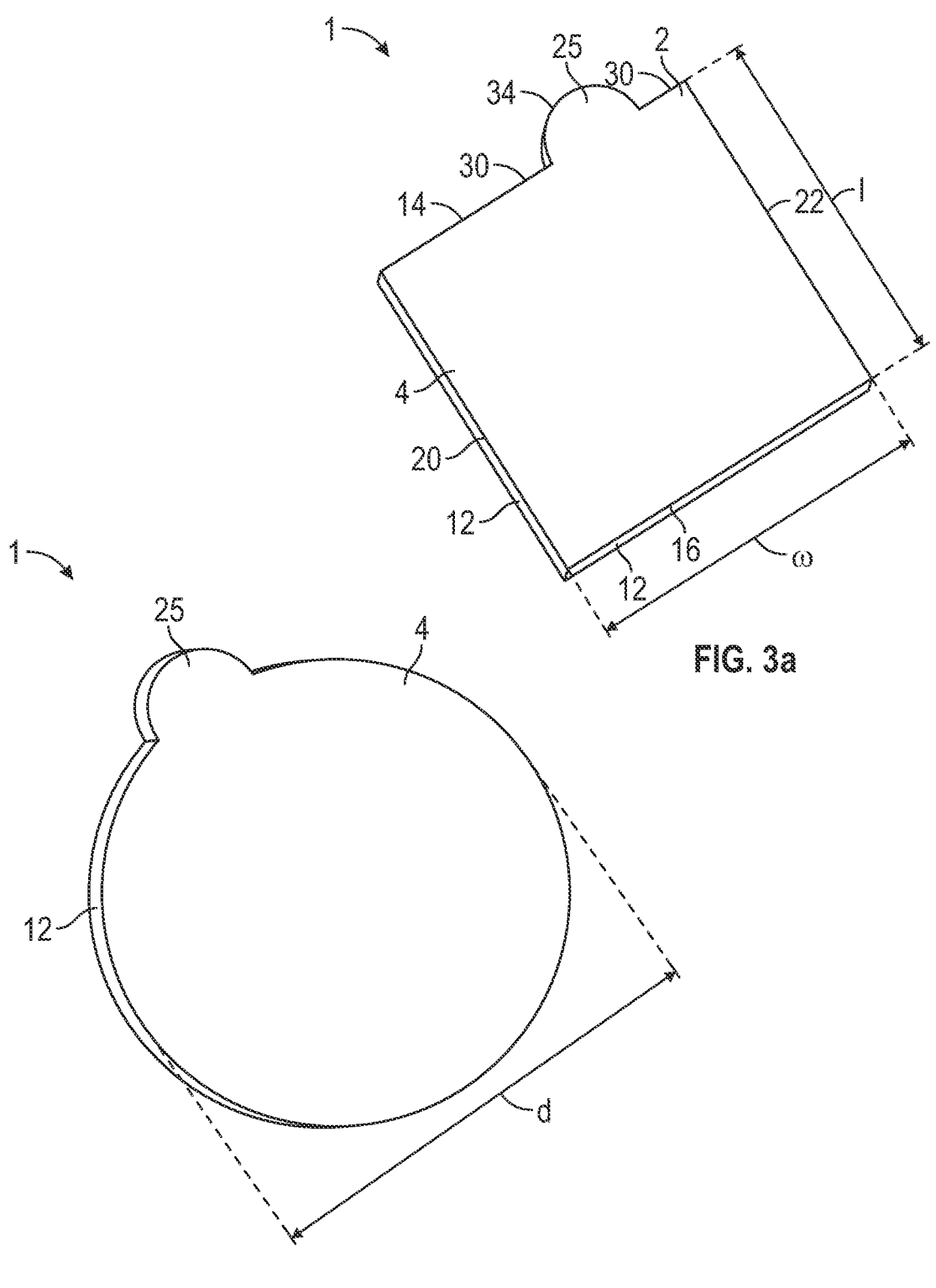
FIG. 3A is a front perspective view of another embodiment of the shield constructed in accordance with the present disclosure.
FIG. 3B is a front perspective view of another embodiment of the shield constructed in accordance with the present disclosure.

The shield 1 of FIGS. 1-3A, is constructed of a substrate 2 having a first surface 4, a second surface 8, and an outer peripheral edge 12. In the embodiment of FIGS. 1, 2 and 3A, the substrate 2 of the shield 1 is provided with a generally rectangular shape having a first end 14, a second end 16, a first side 20, and a second side 22. The first end 14, the second end 16, the first side 20, and the second side 22 can be provided with a variety of shapes such as linear, arcuate, fanciful combinations thereof, or the like. In one embodiment, the first end 14 of the substrate 2 of the shield 1 is shaped so as to provide and surround a tab 25 of the substrate 2 of the shield 1. In this embodiment, the first end 14 of the substrate 2 of the shield 1 is shaped so as to have one or more linear section 30, and an arcuate section 34. In the embodiment shown, the first end 14 of the substrate 2 of the shield 1 is provided with two linear sections 30 separated by the arcuate section 34. The arcuate section 34 surrounds and forms the tab 25 on the first end 14 of the substrate 2 of the shield 1. The first surface 4 of the substrate 2 of the shield 1 has a tackiness to permit the shield 1 to temporarily adhere to an inner surface 36 of a window 40 (see FIG. 4). In another embodiment, the second surface 8 of the substrate 2 of the shield 1 has a tackiness to permit the shield 1 to temporarily adhere to the inner surface 36 of the window 40. In another embodiment, the first surface 4 and the second surface 8 have a tackiness to permit the substrate 2 of the shield 1 to temporarily adhere to the inner surface 36 of the window 40.

The substrate 2 of the shield 1 may be constructed entirely of a polymeric material gel. The polymeric material gel may have a thickness extending from the first surface 4 to the second surface 8. The thickness can be within a range from about 1.5 millimeters to about 25.4 millimeters, and in some embodiments from 1.5 mm to 3 mm. In a preferred embodiment, the polymeric material gel may have a thickness within a range from about 6.35 millimeters to about 12.7 millimeters. The thickness may be uniform (i.e., within predetermined manufacturing tolerances) so as to provide uniform glare reduction. FIG. 3A illustrates another embodiment of the shield 1 constructed in accordance with the present disclosure. The substrate 2 of the shield 1 has a length extending from the first end 14 to the second end 16 of the substrate 2 of the shield 1. The length of the substrate 2 of the shield 1 may be in a range from about 4 inches to about 12 inches, in a preferred embodiment the length of the substrate 2 of the shield 1 may be in a range from about 5 inches to about 7 inches. The substrate 2 of the shield 1 may have a width extending between the first side 20 to the second side 22 of the substrate 2 of the shield 1. The width of the substrate 2 of the shield 1 can be in a range from about 4 inches to about 12 inches. In a preferred embodiment the width of the substrate 2 of the shield 1 may be in a range from about 5 inches to about 7 inches. Shown in FIG. 3B is another embodiment of the shield 1 constructed in accordance with the present disclosure. The shield 1 of FIG. 3B is identical in construction and function as the shield 1 depicted in FIG. 3A, with the exception that the shield 1 has a substrate 2 with an outer peripheral edge 12 having a generally circular shape. In one embodiment, the generally circular shape of the substrate 2 of the shield 1 has a diameter in a range of about 4 inches to about 12 inches. In a preferred embodiment, the circular shape of the substrate 2 of the shield 1 has a diameter in a range of about 5 inches to about 7 inches. In one embodiment, the shield 1 has at least one surface having a contiguous area within a range from about 12 square inches to 113 square inches.

In one embodiment, the polymeric material gel comprises a hydrocarbon oil, one or more triblock, radial block, and/or multiblock copolymer. It is understood to those of ordinary skill in the art, that the varying amount, ratio and types of polystyrene-rubber-polystyrene triblock copolymers controls the gel consistency. The polymeric material gel can retain a gel-like consistency feature over time; i.e., the polymeric material gel is flexible, and stretchable. The polymeric material gel may have a tackiness that is sufficiently weak and durable to permit the substrate 2 of the shield 1 to be removably connected to the inner surface 36 of the window 40 as discussed herein. According to the present disclosure, the polymeric material gel can be made of a styrene rubber copolymer having a weight average molecular weight (Mw) of at least 90,000, preferably at least 200,000, more preferably at least 300,000, and a polystyrene content of 25 to 45 weight percent, preferably 28 to 40 weight percent, more preferably 30 to 35 weight percent. In general, the higher amount of copolymer, the stiffer the polymeric material gel. Additionally, the higher amount of triblock, radial block, and/or multiblock copolymer in polymer blend, the stiffer the blend of the polymeric material gel. The polymeric material gel is generally transparent. The composition of the polymeric material gel may include a blend including a mixture of polymers in combination with hydrocarbon oil.

The hydrocarbon oil is desirably a natural or synthetic hydrocarbon oil of carbon chain length from 10 to 50. The oil may, for example, be a paraffinic oil naphthenic oil or a natural mineral oil. They hydrocarbon oil can, for example be natural or synthetic cosmetic grade hydrocarbon oil. The hydrocarbon oil may be selected from paraffinic oil, naphthenic oil or natural oils, or "white" oil.

A mineral oil is highly refined, colorless, and an odorless petroleum oil. In one embodiment a "white" mineral oil may be mixed with thermoplastic rubber. This type of mineral oil is generally recognized as safe for contact with human skin. Mineral oil may be characterized in terms of its density and viscosity, where light mineral oil is relatively less viscous than heavy mineral oil. Mineral oil is available commercially in both USP and NF grades. Examples of commercially available suitable mineral oils include Sonneborn® and Carnation® white oils from Witco, Isopar® K and Isopar® H from ExxonMobil, and Drakeol®, Draketex®, Parol® white mineral oils from Penreco Company.

Commercially available thermoplastic rubber type copolymers, which are especially useful in forming the polymeric material gel of the present disclosure, are sold under the trademark Septon™ and manufactured by Septon™ Company of America. The polymeric material gel is available as a hydrogenated polyisoprene/butadiene (SEEPS) polymer. The grade of the polymer is designated as Septon™ 4030, 4033, 4044, 4055, and 4077. Each molecule of SEEPS polymer consists of block segments of styrene monomer units and hydrogenated conjugated diene monomer units. The polystyrene block may act as a cross linking point at a temperature below the glass transition temperature of polystyrene. The rubber block acts as an origin of rubber like properties; hydrogenation thereof provides excellent heat resistance and weather ability.

Low molecular weight polyalphaolefin may be added to maintain the rigidity of the polymeric material gel of the shield 1. The most unique characteristics of this highly branched alphaolefin polymers is the ability to bind oil, increase the hardness, very flexible and provide lubricity properties. Commercially available polyalphaolefin polymers, which are especially useful in retaining the rigidity of the polymeric material gel of the present disclosure, are sold under the trademark VYBAR® and manufactured by Baker Hughes, Inc.

In another embodiment, commercially available thermoplastic rubber type polymers are especially useful in forming the polymeric material gel of the present disclosure. Both Kraton Chemical Company and Septon Company of America sell commonly used polymers. The most common structure is the linear ABA block type; styrene-butadiene-styrene (SBS) and styrene-isoprene-styrene (SIS) which is the Kraton D rubber series. Kraton G is another type of polymer. The copolymer comprises a styrene-ethylene-butylene-styrene (S-EB-S) structure. The optionally blended di-block polymers include the AB type such as styrene-ethylene-propylene (S-EP) and styrene-ethylene-butylene (S-EB), styrene-butadiene (SB) and styrene-isoprene (SI). Septon resins are available in either di-block (A-B) or the more common triblock) A-B-A) types. These include a hydrogenated poly-isoprene (S-EP, S-EP-S), a hydrogenated poly-isoprene/butadiene (S-EEP-S) polymer or a hydrogenated poly-butadiene (SEBS) polymer. Depending on the hardness of the substrate of the thermoplastic rubber compositions of ink, employing various combinations of triblock and radical block may be necessary.

Colorants, either organic pigments or inorganic pigments, give color to a substrate 2 by altering its reflective characteristics. There are hundreds of different types of pigment produced. Some are formed by nature in mineral or vegetable forms, but most are synthetic materials. When ink is applied to a substrate 2, colorants may either remain on the surface or fill voids in irregular surfaces. In one embodiment, the substrate 2 may contain a colorant that may produce a desired color appearance. In one embodiment, the substrate 2 may contain the colorant that may produce a tint. The tint of the substrate 2 may prevent certain spectrums of light to pass through the first surface 4 of the substrate 2 to the second surface 8 of the substrate 2. In another embodiment, the tint of the substrate 2 may prevent a certain spectrum of light to pass through the second surface 8 of the substrate 2 to the first surface 4 of the substrate 2. In one embodiment, the colorant may be applied by a materials manufacturer or a molding manufacturer. In another embodiment, the colorant may be added to the first surface

4 of the substrate 2 of the shield 1 or the second surface 8 of the substrate 2 of the shield 1 by submersing the shield 1, either partially or entirely, into the colorant. In another embodiment, the tint of the substrate 2 of the shield 1 may be formed by positioning a liquid vinyl on the first surface 4 of the substrate 2. In another embodiment, the tint of the substrate 2 of the shield 1 may be formed by positioning the liquid vinyl on the second surface 8 of the substrate 2. In one embodiment, the tint of the substrate 2 of the shield 1 may be formed by positioning the liquid vinyl on the first surface 4 of the substrate 2 and the second surface 8 of the substrate 2.

Additives are substances that may be used in small quantities. The function is to adjust the ink properties, such as flow, viscosity, or characteristic of the surface. Examples of such additives include, but are not limited to, adhesion modifiers, matting powder, anti-foam agent, wetting agent, antioxidant, antistatic agents, and flow control agents. Additionally, additives, such as light absorbers, assist in the attenuation of the glare of the light source by the addition of color to the gel of the shield 1. In one embodiment, an additive may comprise of the light absorber 2-)2-hydroxy-5-tert-cotylphenyl) benzotriazole, sold under the name Cyasorb UV-5411 light absorber and also Tinuvin 328 and 770 by Ciba Specialty chemicals.

Translucent inks may be used to create a color layer on a surface of the substrate 2 of the shield 1. The function of the translucent ink is to create a color layer displaying a term, phrase, logo, image, or the like, on the surface of the substrate 2. Examples of translucent ink include, but are not limited to, primary colors. One or more primary colors may be printed in layers to reproduce the colors of an original term, phrase, logo, image, or the like. In one embodiment, the translucent ink may be positioned on the first surface 4 of the substrate 2 of the shield 1. In another embodiment, the color layer may be formed by printing the translucent ink on the second surface 8 of the substrate 2 of the shield 1. In another embodiment, the color layer may be formed by printing the translucent ink on the first surface 4 and the second surface 8 of the substrate 2 of the shield 1.

Figure 4:
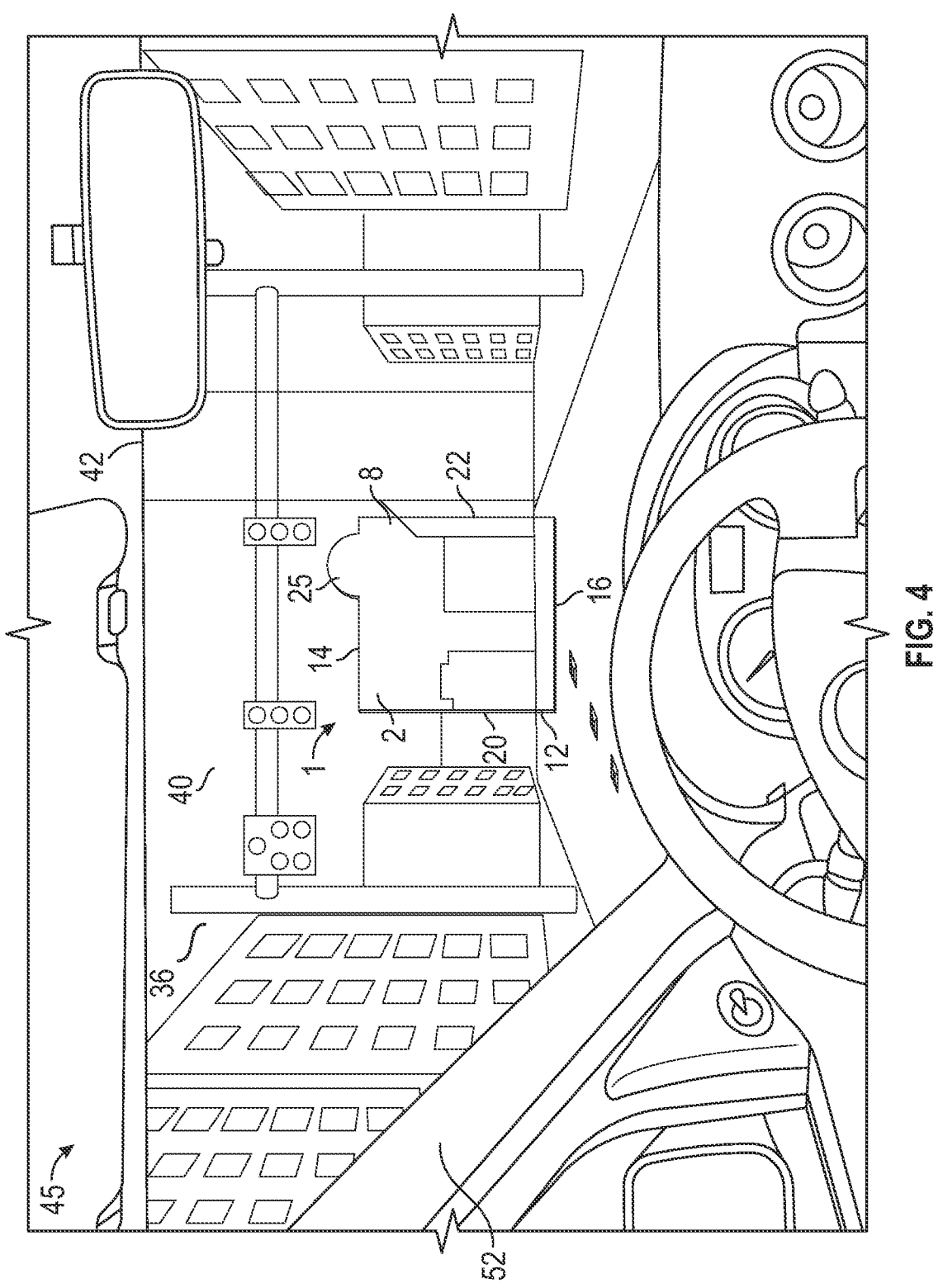
FIG. 4 is a perspective view of an exemplary glare blocking assembly illustrated herein as having a shield used in combination with a window of a vehicle, e.g., an automobile, constructed in accordance with the present disclosure, and having the shield in a first position on an inner surface of a window, e.g. a windshield, to attenuate a glare from a light source in accordance with the present disclosure.

Referring now to FIG. 4, shown therein is a perspective view of an exemplary glare blocking assembly 45 having the shield 1 used in combination with the window 40 of the vehicle 52, e.g., an automobile, constructed in accordance with the present disclosure. The vehicle 52 can be provided in a variety of forms, such as an automobile, an aircraft, a snowmobile, a motorcycle, a tractor, a combine, a backhoe or the like. In general, the vehicle 52 has a frame (not shown), a source of motive force (not shown) supported by the frame for providing mechanical power to the vehicle, a propulsion system (not shown) receiving mechanical power provided by the source of motive force for propelling the vehicle, a body supported by the frame providing coverage for the source of motive force and the propulsion system, and having one or more window 40 supported by the body. For an aircraft, the propulsion system may include a source of thrust, such as a propeller, turbine engine or the like, one or more wing, and control surfaces. In the example shown, the vehicle 52 is an automobile. In general, the vehicle 52 also includes the shield 1 removably connected and supported by the window 40 without requiring any additional support from the frame or other device connected to the frame of the vehicle 52 outside of the window 40. The window 40 is shown by way of example as a windshield. It should be understood, however, that the window 40 could be a side or rear window. In one embodiment, the shield 1 may be formed to be positioned around a base of a mirror of a vehicle 52.

Figure 5:
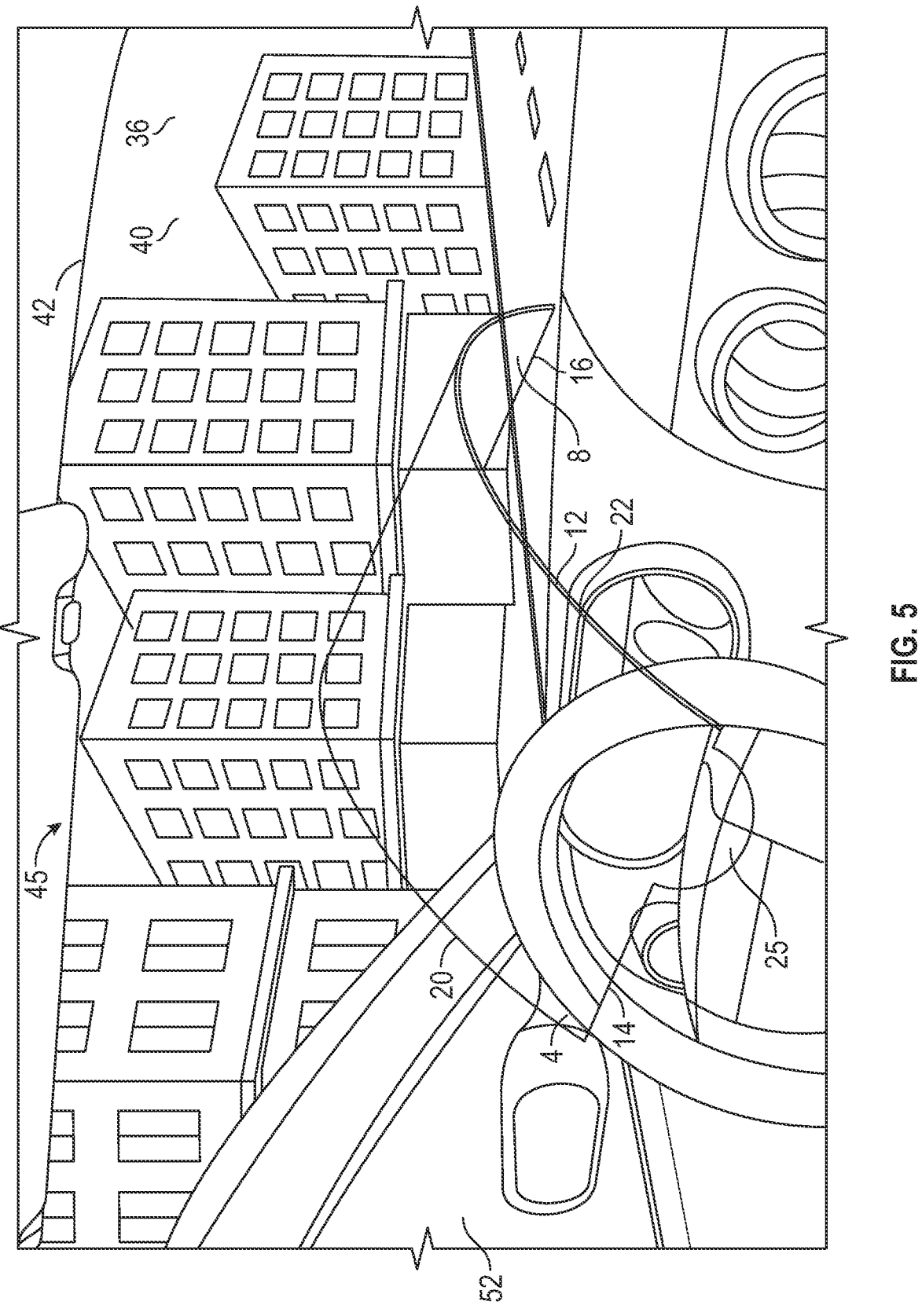
FIG. 5 is a perspective view of the exemplary glare blocking assembly depicted in FIG. 4, in which the shield is being removed from the inner surface of the window in accordance with the present disclosure.
Figure 6:
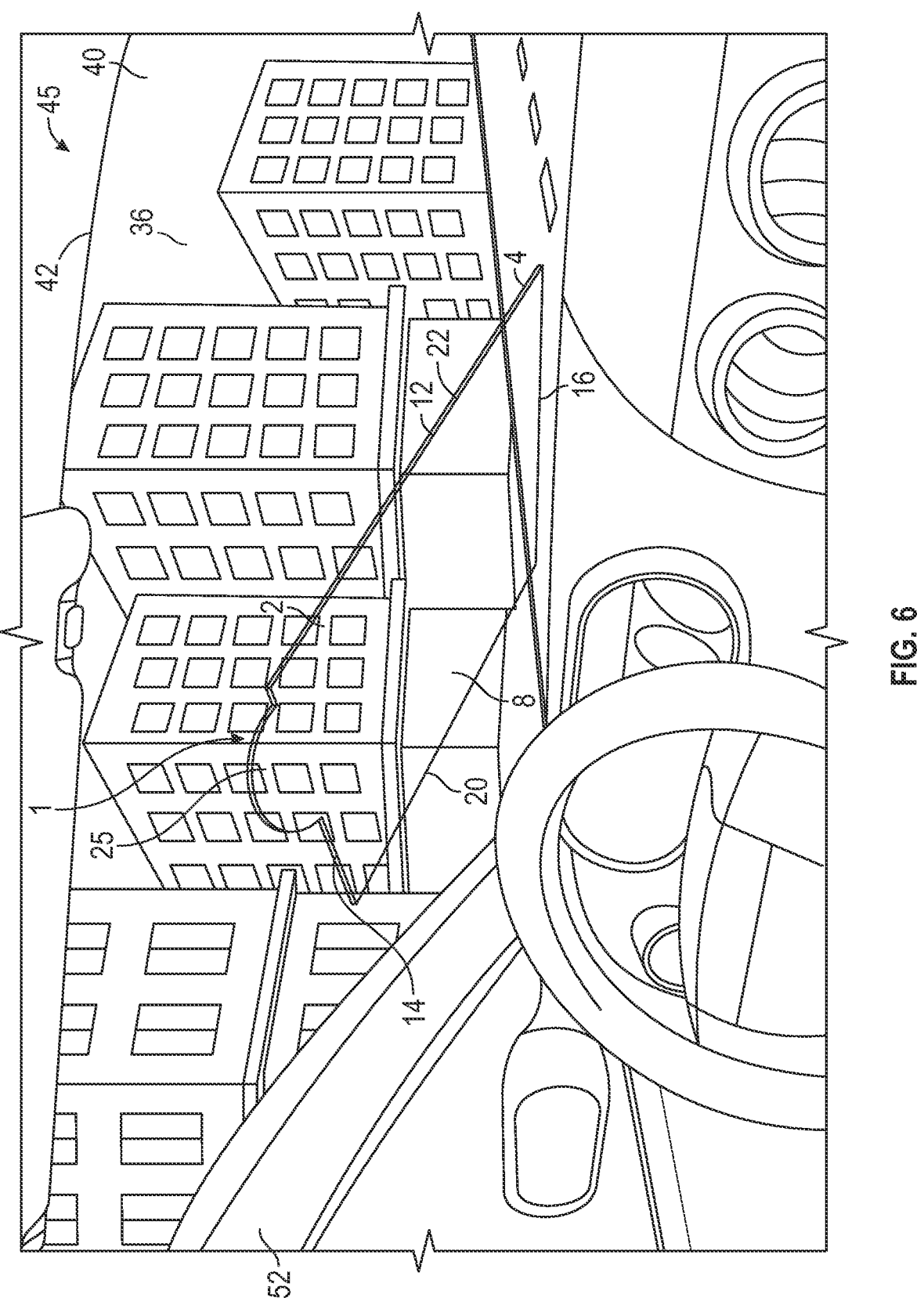
FIG. 6 is a perspective view of the exemplary glare blocking assembly depicted in FIG. 4, in which the shield is in a second position on the inner surface of the window, e.g., a windshield of the vehicle, to attenuate the glare from the light source in accordance with the present disclosure.

FIG. 4, in particular, illustrates the shield 1 in an exemplary first position on the window 40 to attenuate glare from the light source in accordance with the present disclosure. More particularly, the window 40 includes an inner surface 36 and an outer surface 42. The first surface 4 of the substrate 2 of the shield 1 is removably connected to the inner surface 36 of the window 40. As discussed above, the shield 1 may be made of a polymeric material gel having a tackiness on the first surface 4 and/or the second surface 8. When the first surface 4 of the substrate 2 of the shield 1 is applied to the inner surface 36 of the window 40, the tackiness of the first surface 4 adheres to the inner surface 36 of the window 40 thereby supporting the shield 1 in a stationary position. As shown in FIG. 5, to remove the shield 1 from the inner surface 36 of the window 40, an individual may grasp the tab 25, and apply force to the tab 25 in a direction away from the inner surface 36 of the window 40 so as to separate the shield 1 from the window 40. Thereafter, as shown in FIG. 6, the individual may reapply the shield 1 to the inner surface 36 of the window 40 at a second position. For example, the position of the glare from the light source relative to the individual may change as the vehicle 52 moves relative to the light source.

In use, an individual located within the vehicle 52, for example, perceives a glare from the light source coming through the window 40, e.g., the windshield. The individual positions the first surface 4 of the shield 1 on the inner surface 36 of the window 40 between the individual and the glare so as to block the glare from the light source from the individual. An individual may perceive a need to position the shield 1 due to the position of the glare changing. In this case, the shield 1 may be repositioned between the individual and the glare, as discussed above, by the individual grasping the tab 25 and applying force in a direction away from the inner surface 36 of the window 40 to separate the shield 1 from the inner surface 36 of the window 40. Then, the individual may re-apply the shield 1 to the inner surface 36 of the window 40 at a second position to block the glare from the individual.

In another embodiment, the individual may position the second surface 8 of the shield 1 on the inner surface 36 of the window 40. In one embodiment, the individual may position the shield 1 by holding the tab 25.

CONCLUSION

Conventionally, sun visors or sun visor extensions have been manufactured for blocking the glare from the sun; however, the area of intense glare may continue to lie below the sun visor/sun visor extender, requiring the driver to remove one hand from the wheel to personally shield the glare. Electronic versions for blocking the glare from the sun also block the glare from the sun near the top of the windshield and/or require driver input to effectively block the glare from the sun not alleviating the issue of distracted driver and dangerous driving conditions. In accordance with the present disclosure, an individual located within a vehicle may perceive a glare from the sun, and then apply the shield to the window between the individual and the glare. The shield attenuates the glare from the sun thereby allowing the individual to be more comfortable, and less distraction, thereby resulting in safer driving conditions.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the disclosure unless explicitly described as such. Further, the phrase "based on" is intended to mean "based, at least in part, on" unless explicitly stated otherwise.

What is claimed is:

1. A method for attenuating a glare from a light source during travel, comprising:

perceiving a glare from the light source by an individual located within an automobile during travel, the automobile having at least one window, the window having an inner surface having a window surface area; and positioning one or more shield directly on the inner surface of the window between the individual and the glare so as to block the glare from the individual, the one or more shield having a first planar surface, a second surface opposite from the first planar surface, and at least one edge, wherein at least one of the first planar surface and the second surface has a contiguous shield area within a range from about 12 square inches to about 113 square inches, the shield area smaller than the window surface area, the first planar surface having a tackiness to permit the first planar surface of the one or more shield to temporarily attach and reattach directly to the inner surface of the window, the one or more shield being constructed of a polymeric material gel having a thickness measured from the first planar surface to the second surface within a range from about 1.5 millimeters to about 25.4 millimeters, wherein the polymeric material gel is a thermoplastic rubber gel, wherein the one or more shield has a pigment to attenuate light, the pigment allowing a visual light transmission within a range from 25% to 80%.

2. The method for attenuating a glare from the light source during travel of claim 1, wherein the one or more shield has a tab.

3. The method for attenuating a glare from the light source during travel of claim 1, wherein the individual located within the automobile does not perceive a glare from the light source, and removes the one or more shield from the inner surface of the window.

4. The method for attenuating a glare from the light source during travel of claim 1, wherein the one or more shield includes a first shield and a second shield, the first shield positioned directly on the inner surface of the window between the individual and the glare from the light source and the second shield positioned adjacent to the first shield directly on the inner surface of the window between the individual and the glare from the light source.

5. A sun glare blocking assembly, comprising:

a window having an inner surface and an outer surface, the inner surface having a window surface area; and one or more shield, the one or more shield comprising:

a substrate having a first planar surface, a second surface opposite from the first planar surface, a first end, a second end, a first side, a second side, and one or more outer peripheral edge, the first planar surface having a tackiness configured to removably attach and reattach the first planar surface of the substrate directly to the inner surface of the window, the substrate being constructed of a polymeric material gel having a thickness measured from the first planar surface to the second surface within a range from about 1.5 millimeters to about 25.4 millimeters, and the first planar surface having a contiguous shield area within a range from about 12 square inches to about 113 square inches, the shield area smaller than the window surface area, wherein the polymeric material gel is a thermoplastic rubber gel, wherein the one or more shield has a pigment to attenuate light, the pigment allowing a visual light transmission within a range from 25% to 80%.

6. The sun glare blocking assembly of claim 5, wherein the one or more shield has a tab.

7. The sun glare blocking assembly of claim 5, wherein the one or more shield includes a first shield and a second shield, the first shield positioned directly on the inner surface of the window between an individual and a glare from a light source and the second shield positioned adjacent to the first shield directly on the inner surface of the window between the individual and the glare from the light source.

8. A vehicle, comprising:
a frame;
a source of motive force supported by the frame for providing mechanical power for the vehicle;
a propulsion system receiving the mechanical power provided by the source of motive force for propelling the vehicle;

a body providing coverage for the source of motive force and the propulsion system;
a window supported by the body, the window having an inner surface and an outer surface, the inner surface having a window surface area; and
one or more shield, comprising:
a substrate having a first planar surface, a second surface opposite from the first planar surface, a first end, a second end, a first side, a second side, and one or more outer peripheral edge, the first planar surface having a tackiness configured to removably attach and reattach the first planar surface of the substrate directly to the inner surface of the window, the substrate being constructed of a polymeric material gel having a thickness measured from the first planar surface to the second surface within a range from about 1.5 millimeters to about 25.4 millimeters, and the first planar surface having a contiguous shield area within a range from about 12 square inches to about 113 square inches, the shield area smaller than the window surface area, wherein the polymeric material gel is a thermoplastic rubber gel, wherein the one or more shield has a pigment to attenuate light, the pigment allowing a visual light transmission within a range from 25% to 80%.

9. The vehicle of claim 8, wherein the one or more shield has a tab.

10. The vehicle of claim 8, wherein the one or more shield includes a first shield and a second shield, the first shield positioned directly on the inner surface of the window between an individual and a glare from a light source and the second shield positioned adjacent the first shield directly on the inner surface of the window between the individual and the glare from the light source.

* * * * *